United States Patent
Meulenberg (10) Patent No.: US 8,933,362 B2
(45) Date of Patent: Jan. 13, 2015

(54) METHOD AND SYSTEM FOR WELDING PARTS TOGETHER

(75) Inventor: Rudolf Meulenberg, Breda (NL)

(73) Assignee: Fontijne Grotnes B.V., Vlaardingen (NL)

( * ) Notice: Subject to any disclaimer, the term of this patent is extended or adjusted under 35 U.S.C. 154(b) by 1916 days.

(21) Appl. No.: 11/912,090

(22) PCT Filed: Apr. 20, 2006

(86) PCT No.: PCT/NL2006/000205
§ 371 (c)(1),
(2), (4) Date: Jun. 23, 2008

(87) PCT Pub. No.: WO2006/112702
PCT Pub. Date: Oct. 26, 2006

(65) Prior Publication Data
US 2008/0302774 A1     Dec. 11, 2008

(30) Foreign Application Priority Data
Apr. 20, 2005 (NL) ................................ 1028829

(51) Int. Cl.
*B23K 11/25* (2006.01)
*B23K 11/087* (2006.01)
*B23K 11/02* (2006.01)

(52) U.S. Cl.
CPC ............... *B23K 11/087* (2013.01); *B23K 11/02* (2013.01); *B23K 11/252* (2013.01)
USPC ........................................ 219/110; 219/137 R (58) Field of Classification Search
USPC .................. 219/56.21, 56.22, 91.2, 109, 110, 219/117.1, 119, 136, 137 R
See application file for complete search history.

(56) References Cited

U.S. PATENT DOCUMENTS 2,730,599 A * 1/1956 Ronay ........................... 219/611
2,817,747 A * 12/1957 Devonshire et al. .......... 219/110
(Continued)

FOREIGN PATENT DOCUMENTS

DE    1548357    12/1968
DE    2234958    1/1975
(Continued)

OTHER PUBLICATIONS

International Search Report for PCT/NL2006/000205 dated Jul. 18, 2006.
(Continued)

*Primary Examiner* — Brian Jennison
(74) *Attorney, Agent, or Firm* — Jennifer E. Lacroix; DLA Piper LLP (US)

(57) ABSTRACT

A method for welding weldable parts together, for instance for welding annular objects (1), wherein the parts (IA, IB) are subjected to a thermal resistance upset welding process for making the parts (IA, IB) flow together at contact surfaces (S), wherein the welding process (W) depends on a number of input parameters, comprising a pressure exerted on the parts to be welded and a heating current fed through the parts (IA, IB), wherein a number of welding process output parameters, for instance a welding temperature and a displacement of the parts (IA, IB), depend on the input parameters, wherein, during the welding process (W), at least one welding temperature and/or electrical resistance of said parts (IA, IB) is determined, wherein the result of the welding temperature determination and/or resistance determination is used by at least one regulator (R) for automatically readjusting a number of welding process input parameters during the welding process (W), or for automatically adjusting the welding process (W). The invention further provides a welding system, a regulator and a computer program.

20 Claims, 4 Drawing Sheets

(56) References Cited

U.S. PATENT DOCUMENTS

| | | | |
|---|---|---|---|
| 4,359,622 A | 11/1982 | Dostoomian et al. | |
| 4,849,600 A | 7/1989 | Herschitz et al. | |
| 4,876,431 A | 10/1989 | Livingston | |
| 5,165,589 A | 11/1992 | Nied et al. | |
| 5,721,415 A * | 2/1998 | Fortmann et al. | 219/109 |

FOREIGN PATENT DOCUMENTS

| | | |
|---|---|---|
| EP | 0737538 A1 | 10/1996 |
| EP | 1145795 A2 | 10/2001 |
| GB | 1169882 | 11/1969 |
| GB | 1330306 | 9/1973 |
| GB | 1370869 | 10/1974 |
| GB | 2126511 A | 3/1984 |
| JP | 59-61582 | 4/1984 |
| JP | 6-328262 | 11/1994 |
| JP | 8-90250 | 4/1996 |

OTHER PUBLICATIONS

Dutch Search Report for NL 1028829 dated Dec. 19, 2005.

* cited by examiner

METHOD AND SYSTEM FOR WELDING PARTS TOGETHER

The invention relates to a method for welding weldable parts together, for instance for welding annular objects, wherein the parts are subjected to a thermal welding process to make the parts flow together at contact surfaces, wherein the welding process depends on a number of input parameters, comprising a pressure exerted on the parts to be welded and a heating current fed through the parts, wherein a number of welding process output parameters, for instance a welding temperature and a displacement of the parts, depend on the input parameters.

Such a method is known from practice, see for instance EP 0 770 446 B1. The method may, for instance, be used in the manufacture of annular objects, for instance car rims. Here, plates are bent such that ends of each plate are brought towards one another and touch one another in contact surfaces. Here, the ends are pressed against one another with one predetermined constant welding pressure, for a predetermined welding period, while a predetermined constant welding current is fed through the ends of the plate. Under the influence of the welding current, the plate ends reach a yield point, and then—under the influence of the welding force—flow together. Here, the plate ends are pushed together over a particular distance, creating welding grooves. The known method is completely carried out on the basis of predetermined settings, also referred to as set points. In the known method, to this end, above-mentioned predetermined welding current, welding force and welding period have empirically been determined and input in a respective welding device by an operator.

In the known method, typically such a welding current, welding force and welding period are set that a good durable weld is guaranteed. Here, for instance, a relatively high welding force and/or high welding current and/or long welding period is used, so that some extent of 'overwelding' can be achieved, fusing the parts to be welded together over a relatively great distance. This does not only result in loss of material, but also in undesirably large welding grooves, and an undesirably high energy consumption. Further, in practice, it is found to be relatively difficult to accurately and quickly weld end faces of relatively thin plates, or of one bent plate. In addition, various welding process settings are to be empirically determined and set again each time when a different type of parts to be welded, for instance from a different material and/or with different dimensions, is to be welded, or when the welding process is to be carried out on a different welding machine. Therefore the known welding process is little user-friendly.

FR 2 234 958 discloses to measure a total electrical resistance during a welding process.

U.S. Pat. No. 2,871,747 discloses a resistance welding process, wherein the temperature is controlled to follow a predetermined temperature pattern. FIG. 2 of US '747 shows a target graph of a temperature path, wherein an ultimate temperature is 2150° F.

The present invention contemplates an improved method for welding parts. In particular, the invention contemplates a welding process in which parts to be welded can durably be connected to one another with relatively little loss of material.

According to the invention, to this end, the method is characterized in that, during the welding process, at least one welding temperature and/or electrical resistance of these parts is determined, while the result of the temperature determination and/or resistance determination is used by at least one regulator, preferably a multivariable regulator, for automatically readjusting a number of welding process input parameters during the welding process, or for automatically adjusting the welding process.

In particular, the temperature and/or electrical resistance of the parts is determined near the contact surfaces mentioned. Because the regulator can readjust a number of process input parameters, depending on the result of this temperature determination and/or resistance determination, the welding process can be carried out more accurately, while loss of material can be prevented, the creation of undesirably large welding grooves can be prevented, and the energy consumption can be reduced. Thus, 'overwelding' can be prevented well. The number of input parameters to be readjusted may, for instance, comprise one parameter, but preferably comprises two, three or more parameters. In addition, it is found that relatively thin plates, or relatively thin plate parts, can properly and quickly be welded together in this manner, for instance for producing annular objects such as rims. Further, in this manner, different types of parts can be welded together, while a predetermined empirical determination of one or more advantageous process settings can be avoided. Depending on the result of the temperature determination and/or resistance determination mentioned, for instance a starting point of a particular process step can be readjusted, or the mutual speed and/or displacement of the parts to be welded, and/or other welding parameters. Further, the temperature determination may, for instance, advantageously be used for carrying out at least a part of the welding process in a range-controlled manner.

During the welding process, the welding temperature mentioned may, for instance, be determined by means of a calculation. The same holds for the, determination of the electrical resistance of the parts. Further, during the welding process, the welding temperature mentioned, and/or the electrical resistance, may, for instance, be determined on the basis of at least one measurement of a process output parameter mentioned. At least one process output parameter mentioned may comprise a temperature of the parts to be welded. Further, at least one of the process output parameters mentioned may, for instance, comprise an electrical contact resistance between the contact surfaces mentioned. Also, at least one output parameter mentioned may comprise a relative position, displacement or speed of displacement of the parts to be welded.

According to the invention, during the welding process, it is determined whether the welding temperature of the parts has reached a yield point temperature.

In this manner, the welding process can be adjusted in a yield point temperature-dependent manner. It is found that, thus, the welding process can accurately be controlled automatically under the influence of the regulator. The regulator may, for instance, automatically adjust or change process parameters under the influence of the reaching of the yield point.

The regulator automatically changes a number of welding process input parameters during the welding process when it has been determined that the yield point temperature has been reached.

Thus, the weldable parts may, for instance, be heated first, in order to reach the yield point temperature mentioned, while the weldable parts are pressed against one another with a relatively small force. In this manner, heating the weldable parts to the yield point temperature can be carried out in a relatively quick and controlled manner. When it has been determined that the yield point temperature has been reached, the welding process may, for instance, be adjusted, for instance by subsequently carrying out a next stage of the welding process, in which the weldable parts are, for instance, pressed against one another with more or less force to flow together over a relatively short distance. In an embodiment, the welding process is a resistance upset welding process, in particular for, for instance, welding rims. The parts to be welded together may, for instance, comprise the end parts bent towards one another of a plate, for instance for manufacturing a rim mentioned. The welding process may further comprise a different welding form.

In addition, the regulator may, for instance, adjust a range-controlled regulation of the welding process when it has been determined that the yield point temperature has been reached. Thus, a first part of the welding process may, for instance, be carried out in a range-controlled manner on the basis of a predetermined welding pressure range and/or welding temperature range, while a next stage of the welding process—which takes place after the yield point temperature has been reached—is carried out on the basis of a displacement range of the parts to be welded.

The above-mentioned parts to be welded together may be manufactured from various materials, for instance from aluminum or from steel. The parts may, for instance, be manufactured from HR60 steel, or from different materials.

It is noted that the yield point as such is a generally known term to a skilled person. The yield point is the point between the elastic and plastic range of a material.

The yield point can be determined in different manners. Thus, for instance, one or more output parameters may be measured during the welding process. The result of such a measurement may, for instance, be suitable for determining when the yield point mentioned has been reached. Thus, during the welding process, for instance, a calculation may be carried out, for determining the instantaneous yield point temperature from one or more output process parameters. Further, it may, for instance, first be determined by means of calculation and/or experiment what value a yield point-dependent process output parameter, or a parameter derived therefrom, has when this yield point is reached, while then, during the welding process, the value of this yield point-dependent process parameter, or the parameter derived therefrom, is measured, for determining when this yield point is reached.

The process input parameters and process output parameters mentioned may comprise various parameters. An output parameter may, for instance, comprise a value actually reached of an input parameter. Further, output parameters may, for instance, comprise parameters directly resulting from the welding process, and/or comprise parameters derived therefrom.

At least one of the process input parameters mentioned may comprise a pressure with which the parts mentioned are pressed against one another during the welding process. In that case, for instance, a reaction pressure of the parts mentioned, which reaction pressure is an output parameter of the process, may be measured, while, from the result of the measurement of this reaction pressure, it is, for instance, determined when the yield point mentioned has been reached.

Another process input parameter is, for instance, a set electric current which is fed through the parts for the purpose of heating the parts, for instance for the purpose of the resistance welding process. In the latter case, for instance, a first electric current may be fed through the parts before the yield point temperature mentioned has been reached, while the electric current is automatically increased under the influence of the regulator when it has been determined the yield point temperature mentioned has been reached, while the current is then, after a particular welding period, in particular reduced again. Further, a welding current actually reached may, for instance, be an output parameter of the welding process.

In one aspect of the invention, during the welding process, at least one electric welding current and a welding pressure are automatically readjusted by the regulator, for instance depending on the result of above-mentioned yield point temperature determination and/or welding temperature determination. To this end, the regulation may, for instance, comprise a multivariable regulation. It is found that, by means of such a multivariable regulation of the welding process, particularly durable welds can be obtained, within relatively short welding periods. Other advantageous multivariable regulations comprise, for instance, regulation of a respective displacement of the parts on the one hand and the welding current on the other hand, regulation of a respective speed of the parts on the one hand and the electric current on the other hand, and/or a combination thereof and/or regulation of other parameters. The multivariable regulation may further comprise, for instance, range regulation, for instance as described in the above, or a different form of range regulation.

According to an advantageous elaboration of the invention, at least one output parameter comprises an electric potential difference between the above-mentioned parts to be welded together, or a potential difference over electrodes engaging those parts.

The potential difference can be measured relatively simply. In addition, from this potential difference, it can simply be determined or calculated at what moment the yield point temperature has been reached, since, at that moment, a contact resistance between the parts to be welded will virtually have disappeared, or at least be relatively low. The yield point temperature may, for instance, be calculated from a resistance measurement and/or potential measurement, when, further, for instance material properties of the parts to be welded are known. Further, the potential difference may, for instance, be used for calculating what the actual, instantaneous welding temperature or electrical resistance of the parts is during the welding process, for instance in combination with predetermined material properties of the parts to be welded.

According to the invention, the regulator may, for instance, be a multivariable regulator, which regulates the welding process utilizing a plurality of above-mentioned process parameters and/or parameters derived therefrom. With such a regulator, the welding process can be regulated particularly accurately, while detection of the yield point mentioned may, for instance, be used for readjusting the welding process for the purpose of quick and durable welding of the parts.

In one aspect of the invention, the regulator has, for instance, a predetermined temperature profile or temperature range of parts to be welded together, while, during the welding process, the regulator automatically readjusts a number of the process parameters mentioned such that, depending on a measured temperature of the parts, the temperature of the parts substantially follows the predetermined temperature profile or temperature range. This temperature profile or temperature range is in particular the temperature of the parts as a function of time during the welding process.

Further, the regulator according to the invention may, for instance, have a predetermined reference pressure profile, at least a reference pressure as a function of time, while, during the welding process, the regulator automatically readjusts a number of above-mentioned process parameters mentioned such that, depending on a welding pressure actually reached, that welding pressure substantially follows the predetermined reference pressure profile. At least a part of the process may thus be carried out in a force-regulated or pressure-regulated manner.

The regulator may further, for instance, have a predetermined displacement profile of parts to be welded together, at least displacement as a function of time, while, during the welding process, the regulator automatically readjusts a number of above-mentioned process parameters such that, depending on a displacement of the parts actually reached, that displacement reached substantially follows the predetermined displacement profile.

The regulator may, for instance, be a tracking control regulator, which can accurately track one or more of the profiles mentioned during the welding process. If a value to be tracked deviates from the desired profile, the regulator may, for instance, automatically change particular process parameters to bring the respective value to the desired profile again, for instance by readjustment of a welding current and/or pressure exerted on the parts. With regulation based on a profile mentioned, the yield point temperature mentioned may, for instance, be determined, but that is not necessary.

Further, the welding process may, for instance, be regulated based on feedback, feedforward, or in a different manner.

The invention further provides a welding system, arranged for carrying out a method according to the invention, while the welding system is arranged for subjecting parts to be welded together to a thermal welding process, while the system is arranged for bringing the parts brought together at a yield point temperature at contact surfaces.

As mentioned, from practice, a system is known which carries out a welding process only based on priorly input set points. The known system has to be reset completely each time if a different type of parts to be welded is to be welded, for instance parts from a different material or with different dimensions. Such settings are typically carried out by means of trial-and-error methodology, which takes up much time. In addition, after having been set, the known system still does not offer sufficient certainty whether a good weld will be realized therewith. The known system is relatively customer-unfriendly, relatively inaccurate, and produces welds with relatively large weld grooves.

According to one aspect of the present invention, the system is provided with a temperature determiner and/or resistance determiner arranged for determining at least one welding temperature and/or electrical resistance of above-mentioned parts during the welding process, while the system is provided with at least one regulator arranged for automatically readjusting a number of welding process input parameters, or for automatically adjusting the welding process, depending on the result of the determination carried out by the temperature determiner and/or resistance determiner.

The regulator may, for instance, comprise an above-mentioned multivariable regulator. Thus, the regulator can particularly accurately regulate and adjust a large number of process parameters. The regulator may further comprise a different type of regulator. Because the regulator is arranged for automatically readjusting a number of welding process parameters during the welding process, depending on the result of the measurement carried out by the temperature determiner and/or resistance determiner, the welding of the parts can be carried out relatively quickly and automatically. According to the invention, the system, and in particular the regulator thereof, is provided with a yield point temperature determiner arranged for determining a yield point temperature of the weldable parts.

As described in the above, in this manner, by determining when the yield point temperature has been reached, the welding process can accurately be readjusted, for instance for preventing loss of material, for obtaining relatively small welding grooves and/or for obtaining a relatively quick welding process. The yield point temperature determiner may, for instance, be integrated in the regulator or be a separate part of the system.

The regulator may, for instance, be arranged for determining when the yield point temperature of the weldable parts has been reached, while this regulator is arranged for automatically changing at least one of the process input parameters mentioned during the welding process when the yield point temperature of the weldable parts has been reached. In addition, the regulator may, for instance, be arranged for taking the welding process to a next process stage, at the moment when the yield point temperature has been reached, for instance in a displacement range-controlled process stage.

Further, the regulator may, for instance, be arranged for comparing the results of the welding temperature determiner and the yield point temperature determiner with each other, for determining when the yield point temperature mentioned has been reached. In one aspect of the invention, the system may be provided with a memory for storing a yield point value of a process output parameter determined by means of calculation and/or experiment, the regulator being arranged for comparing the stored yield point value with a measured value of that process output parameter, for determining whether the yield point has been reached.

According to a further elaboration of the invention, the regulator is arranged for automatically readjusting a number of process input parameters during the welding process such that, depending on the particular welding temperature of the parts, the temperature of the parts substantially follows a predetermined temperature profile or temperature range, for instance during a first period of the welding process. As mentioned, the regulator may, for instance, regulate the welding process on the basis of a predetermined reference welding pressure profile, or on the basis of a predetermined profile of a different process parameter.

One aspect of the invention relates to a regulator which is provided with a yield point temperature determiner arranged for determining a yield point temperature of the weldable parts (1A, 1B). The regulator (R) can be arranged for automatically readjusting a number of welding process input parameters, or for automatically adjusting the welding process (W), depending on the result of the determination carried out by the temperature determiner and/or resistance determiner (9; TM, C), wherein the regulator is preferably a multivariable regulator, wherein the system, and in particular the regulator, is provided with a yield point temperature determiner arranged for determining a yield point temperature of the weldable parts (1A, 1B). By use of this regulator, a welding process can be carried out relatively quickly and efficiently, with less material consumption.

Another aspect of the invention relates to a computer program. The program is provided with a computer code, configured for, after having been loaded into a computer, making the computer suitable for carrying out a method according to the invention, and/or for making the computer function as a regulator of a system according to the invention. With such a program, for instance, different welding machines can be made suitable for carrying out the invention.

Further elaborations of the invention are described in the claims. The invention will is further explained below in more detail on the basis of an exemplary embodiment and with reference to the drawing, in which:

Figure 1:
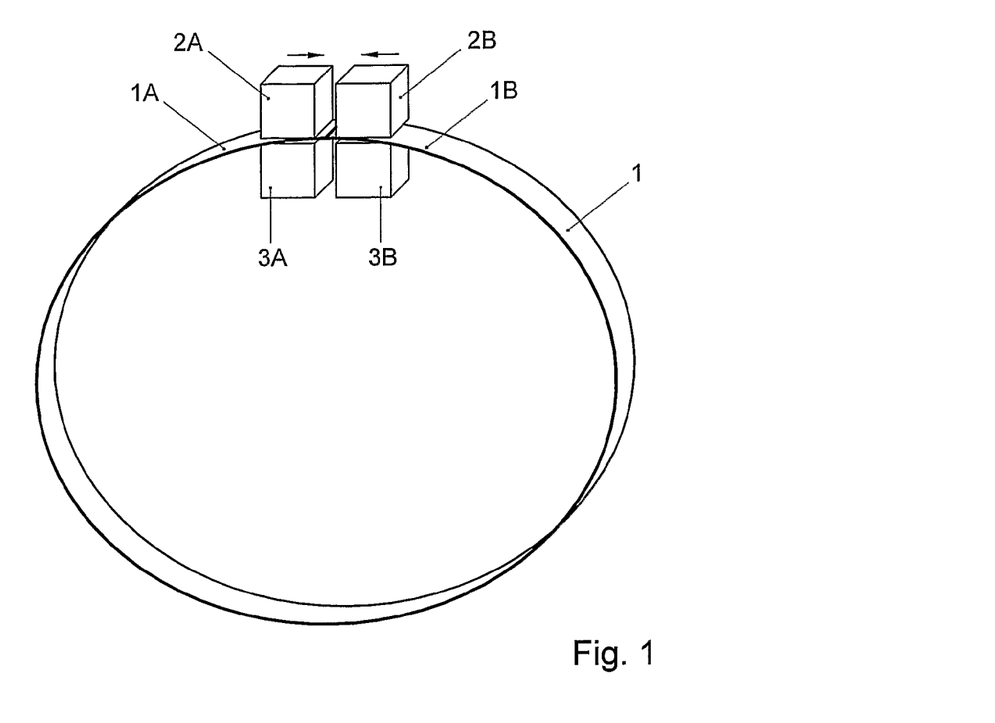
FIG. 1 shows a schematic perspective side elevational view of an exemplary embodiment of the invention.
Figure 2:
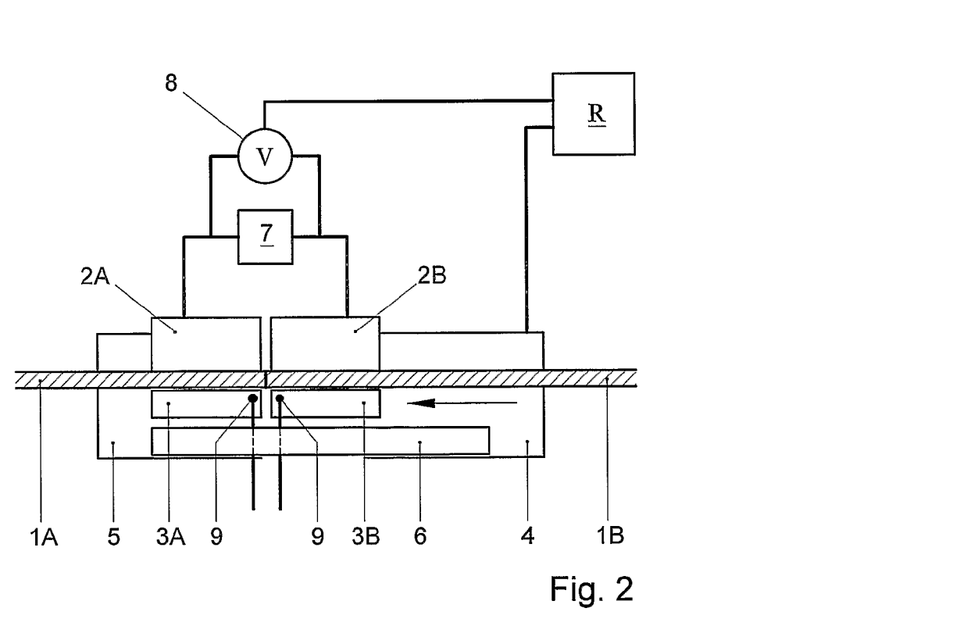
FIG. 2 shows a schematic view of ends of the parts to be welded together of the exemplary embodiment shown in FIG. 1, in more detail.

FIGS. 1 and 2 schematically show a method and a part of a welding system according to the invention, for welding weldable parts 1A, 1B together. The method may, for instance, be part of a production process for the manufacture of vehicle rims from relatively thin plates. The welding system may, for instance, be designed in a similar manner to the resistance upset welding apparatus described in EP 0 770 446 B1, or in a different manner.

As FIGS. 1 and 2 show, the weldable parts 1A, 1B are, for instance, end face parts of a bent flat plate 1. The end parts 1A, 1B are each clamped against a respective electrode 2A, 2B by clamping means 3A, 3B positioned opposite the respective electrode 2A, 2B. In addition, the parts 1A, 1B are pressed against each other by their facing rectangular contact surfaces S under the influence of pressures p (see FIG. 3). The electrodes 2A, 2B are connected to a source of current 7, so that a direct current I generated by that source 7 can be fed via the electrodes 2A, 2B through the parts 1A, 1B touching each other. Under the influence of this direct current, the parts 1A, 1B can be brought to a yield point temperature near the contact surfaces S, utilizing the bulk resistance and contact resistance of the parts, such that the parts 1A, 1B can then be pressed together over a desired distance under the influence of the pressure p.

In order to generate the pressures p mentioned, the one electrode/clamping means assembly 2B, 3B may, for instance, be part of a movable part 4 of the welding system, whereas the other electrode/clamping means assembly 2A, 3A is, for instance, part of a stationary part 5 of the system. Alternatively, the system may be provided with two movable parts 4, 5 each comprising an above-mentioned assembly. A drive 6 is provided for moving above-mentioned movable system part 4 towards and away from the stationary system part 5. It will be clear to a skilled person that such a drive 6 may be designed in different manners. In this manner, the system is provided with a pressing device 2, 3,6 for pressing above-mentioned parts 1A, 1B against each other with a particular welding pressure. The pressing device may further, for instance, serve as a positioning device for making these parts move through a particular displacement range during use.

Further, various sensors may be provided for measuring various welding process output parameters. Such parameters may further be determined by means of calculations, see hereinbelow. The system comprises, for instance, a voltmeter 8 connected to the two electrodes 2A, 2B for measuring a potential difference V between those electrodes. In addition, one or more temperature sensors 9 are provided, for instance thermocouples or other sensors, which are designed for measuring the temperature of the weldable parts 1A, 1B at the contact surfaces S. The temperature sensors may, for instance, be integrated in the clamping means 3A, 3B, and/or be disposed elsewhere.

Alternatively, the temperature of the parts to be welded, at least the welding temperature of the parts near the contact surfaces, may, for instance, be calculated during the welding process. Thus, the system may, for instance, be provided with a welding temperature determiner TM (see FIG. 4) arranged for calculating the welding temperature of the parts mentioned, for instance on the basis of results of measurements of other process output parameters, for instance on the basis of a measured potential difference and/or electrical resistance between the parts 1A, 1B to be welded. Further, the system may, for instance, be provided with a resistance determiner instead of a welding temperature determiner, the resistance determiner being arranged for determining the electrical resistance of the parts 1A, 1B near the contact surfaces.

Further, for instance, a pressure sensor or force sensor may be provided which is configured for measuring what the pressure p is which is exerted on the weldable parts 1A, 1B is during use, or what a reaction pressure exerted by those parts 1A, 1B is, which reaction pressure is the result of the set welding pressure p. The pressure gauge may, for instance, be integrated in above-mentioned drive 6 or be designed differently. In addition, for instance, a displacement transducer or a speedometer may be provided, which is arranged for measuring a displacement or speed, respectively, of the parts 1A, 1B with respect to each other. Such a displacement transducer or speed indicator may be designed in different manners, and may, for instance, be part of the drive 6 or be provided in a different manner.

Further, the welding system according to the invention is provided with a regulator R arranged for automatically readjusting a number of welding process parameters during the welding process, depending on the result of at least one measurement of at least one process parameter. The regulator R as such can be designed in different manners, for instance as hardware and/or as software. As mentioned, the regulator R may be a multivariable regulator in an advantageous manner. The regulator may, for instance, be implemented on the basis of a model of the welding process determined theoretically and/or empirically, for instance utilizing Bode plots and pole-zero determination. The regulator may be arranged for regulating the following process input parameters of the welding process: pressure p, welding current I, relative position, speed and/or displacement x of the parts 1A, 1B. Regulation of these input parameters p, I, x may, for instance, be carried out by the regulator R on the basis of at least the welding temperature of the parts 1A, 1B. In addition to the welding temperature, other process output parameters are, for instance, a relative position actually reached, a speed reached, a welding pressure p' reached, a welding current I' reached, a potential difference V between the electrodes 2A, 2B and/or a displacement x' of the parts reached. Further, the regulator R may be arranged for regulating the welding process depending on at least one material property of above-mentioned parts, at least one dimension of above-mentioned parts, and/or other parameters. Information concerning material properties and/or dimensions may, for instance, be input into the regulator R prior to the welding process. In addition, it is advantageous if the regulator R is arranged for adjusting the welding process to, for instance, the specifications and ranges of other parts of the welding system, such as of the source of current 7 and/or the pressing device 2, 3, 6.

Figure 4:
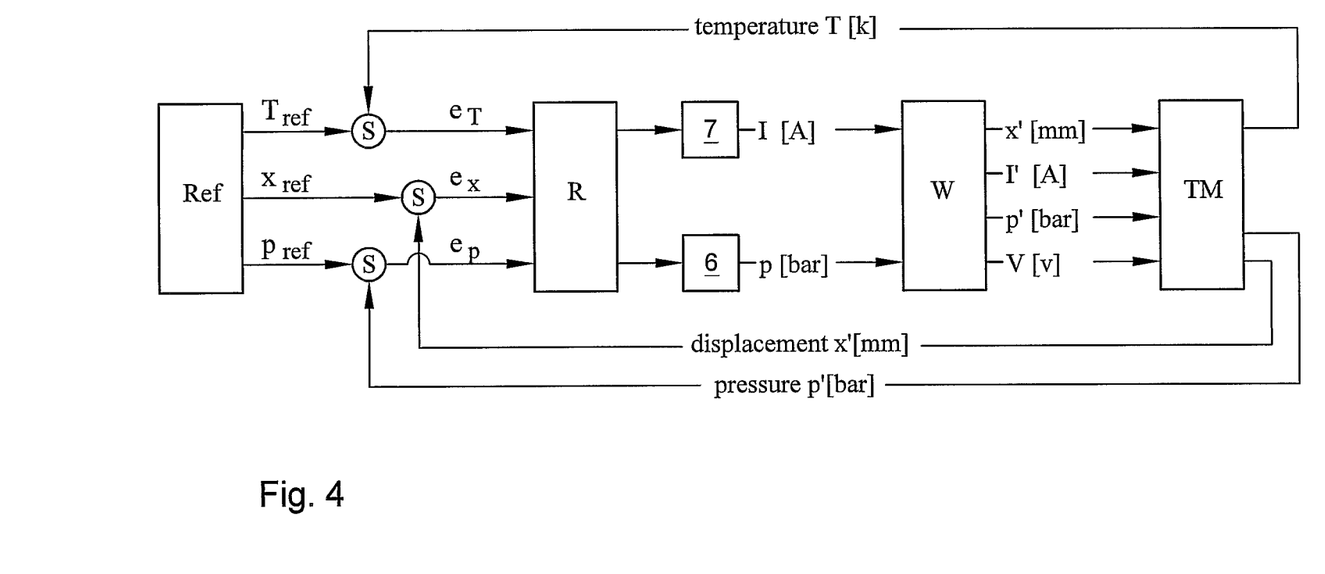
FIG. 4 shows a schematic diagram of a regulation of a welding process according to an exemplary embodiment of the invention.

FIG. 4 shows a possible description of the regulation of the welding process W, which process W can be controlled under the influence of the regulator R. In this case, the regulator R is arranged for using welding process input parameters pressure p and welding current I for reaching a particular welding temperature T and a relative position, speed or displacement x' of the parts to be welded, so that a desired weld is obtained.

An above-mentioned welding temperature determiner is designated by TM in FIG. 4. This temperature determiner TM is arranged for determining the instantaneous welding temperature of the parts 1A, 1B on the basis of one or more output parameters V, p', I', x' of the welding process W.

As FIG. 4 shows, the regulation of the welding process may, for instance, comprise a number of comparators S and a reference unit Ref. The reference unit Ref may, for instance, contain a predetermined temperature profile $T_{ref}$ as a function of time, a predetermined displacement range $x_{ref}$ as a function of time, and a predetermined pressure profile $p_{ref}$ as a function of time. The comparators S may, for instance, be arranged for comparing the values of the welding temperature T reached, the displacement x' reached and/or the welding pressure p' reached with the respective predetermined range $T_{ref}$, $x_{ref}$, $p_{ref}$. The result of that comparison may then be fed to the regulator R, so that the regulator R can determine whether a desired range $T_{ref}$, $x_{ref}$, $p_{ref}$ has actually been reached. The regulator R may, for instance, change the input parameters when it is found that the desired range has not been reached, such that the respective parameter is brought closer to the desired range. To a skilled person, it will be clear that such a regulation can be designed in various manners.

The regulator R may further, for instance, be integrally provided with a yield point temperature determiner arranged for determining when the yield point temperature of the weldable parts has been reached. Alternatively, the yield point temperature determiner is a separate part. The regulator R may be arranged for comparing the results of the welding temperature determiner TM and the yield point temperature determiner with each other, for determining when the above-mentioned yield point temperature has been reached.

Further, the regulator R may be arranged for using a result of the determination of the yield point temperature provided by the yield point temperature determiner for automatically changing the value of one or more of above-mentioned process parameters during the welding process. Thus, the welding process can be readjusted in a yield point temperature-dependent manner. Alternatively, the regulator R may be designed for adjusting a range-controlled regulation of the welding process W after it has been determined that the yield point temperature has been reached.

The yield point temperature determiner may be configured in various manners. When, during use of the exemplary embodiment, for instance the above-mentioned yield point temperature is reached, there will hardly be contact resistance between the parts 1A, 1B anymore, which is measurable with the aid of the voltmeter 8. In addition, the parts 1A, 1B will have a particular welding temperature upon reaching the yield point, which can be detected with the temperature sensors 9. Further, upon reaching the yield point temperature, the parts can start to flow together, for instance under the influence of the pressure p, which is recordable with the displacement sensor and/or force sensor.

The yield point determiner of the regulator R may be arranged for determining when above-mentioned yield point temperature has been reached from the result of measurements carried out by a number of above-mentioned sensors 8, 9 when above-mentioned yield point temperature has been reached. To this end, the regulator R may, for instance, be connected to the voltmeter 8, the temperature sensors 9, above-mentioned displacement sensor and/or above-mentioned force sensor, as schematically shown in FIG. 2. Further, the yield point temperature determiner may, for instance, be provided with a memory for storing a yield point value of a process output parameter determined by means of calculation and/or experiment, while the regulator is arranged for comparing the stored yield point value with a measured value of that process output parameter, for determining whether the yield point temperature has been reached. Thus, the value of contact resistance upon reaching the yield point, or a resistance range during the welding process, may for instance have already been determined empirically and/or theoretically, and be stored in the yield point determiner. The same holds for other parameters, for instance for above-mentioned temperature, displacement and/or forces. Further, for the purpose of use, the system may, for instance, be synchronized first, while the system is arranged for carrying out a number of synchronizing steps, for test parts to be welded together, for synchronizing the regulator R. To this end, the regulator R may, for instance, comprise a self-learning regulator, which is, for instance, based on an iterative learning control principle or the like.

Figure 3:
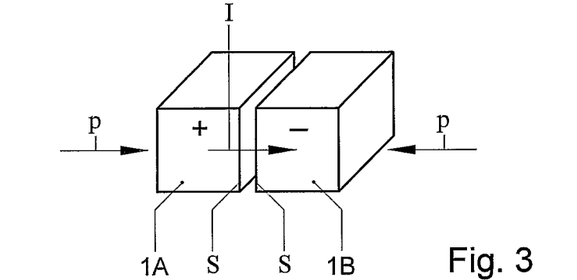
FIG. 3 shows a schematic perspective view of a detail of the exemplary embodiment.

During use of the system shown in FIGS. 1-3, the weldable parts 1A, 1B are first brought towards each other by their contact surfaces S and then pressed against each other. Then, the parts 1A, 1B are subjected to a thermal welding process for making the parts flow together at the contact surfaces. Here, the parts are pressed against each other by their contact surfaces S by a pressure p mentioned, and a heating current I is fed through the parts (see FIG. 3). Under the influence of that current I, the parts are heated at least at the contact surfaces for reaching the yield point temperature mentioned.

During the welding process, one or more temperature measurements may be carried out, by above-mentioned temperature sensors 9, for determining the instantaneous welding temperature of the parts 1A, 1B to be welded. Alternatively, that welding temperature may, for instance, be calculated by the welding temperature determiner TM, for instance utilizing measuring results of the voltmeter 8.

The result of this welding temperature determination is used by the regulator R for automatically readjusting a number of above-mentioned process input parameters during the welding process. Here, it may, for instance, also be determined when the yield point temperature of the weldable parts is reached. The result of the determination of this yield moment may then be used by the regulator R for automatically changing the value of at least one of above-mentioned process input parameters during the welding process, for the purpose of acceleration of the welding process and/or for the purpose of preventing groove formation. The regulator R may, for instance, automatically readjust the welding process when it has been determined by the yield point temperature determiner that the yield point temperature has been reached.

Alternatively, the welding process is regulated by the regulator in a controlled manner on the basis of a temperature range. To this end, the regulator R may, for instance, have at least one predetermined temperature profile or temperature range of parts 1A, 1B to be welded together, as shown in FIG. 4. The regulator R can then automatically readjust a number of above-mentioned process input parameters during the welding process W such that, depending on the determined welding temperature of the parts 1A, 1B, the temperature of the parts 1A, 1B substantially follows the predetermined temperature profile or temperature range.

After a desired weld has been formed, the heating current I can automatically be turned off by the regulator R. The parts 1A, 1B may then, for instance, be cooled down actively or passively, while the parts are then pressed against each other for a particular cooling period, in order to then be processed further as desired or the like.

The following examples show possible regulations of the welding process, which are, for instance, carried out under the influence of an above-described regulator R.

EXAMPLE 1

Figure 5:
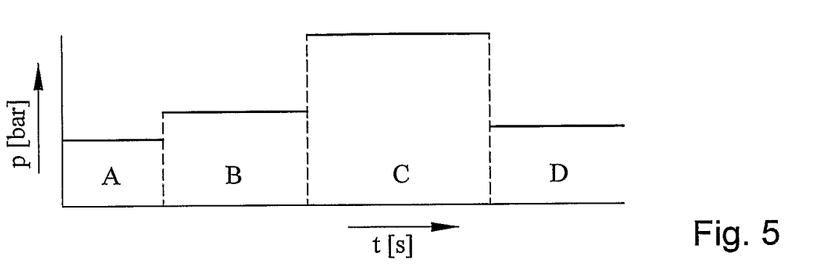
FIG. 5 shows a force-time diagram of a first regulation according to the invention.
Figure 6:
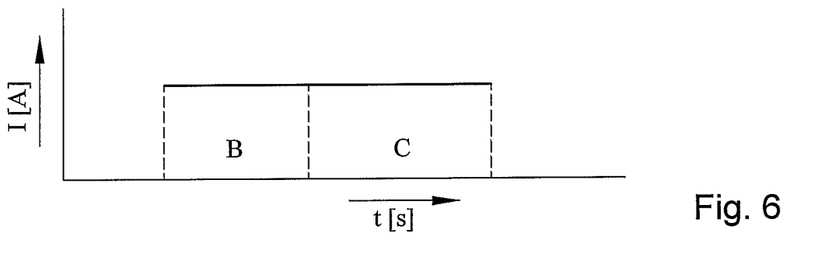
FIG. 6 shows a current-time diagram of the first regulation according to the invention.

FIGS. 5 and 6 show a first example of a regulation of a welding process according to the invention carried out under the influence of the regulator R. In FIG. 5, the pressure p (bar) set by the regulator R is plotted against time t (s), and FIG. 6 shows the heating current I set by the regulator R as a function of time t. As these Figures show, with the first example, in a first process step A, the parts 1A, 1B to be welded together are brought towards each other and kept against each other with a relatively low pressure. With a next process step B, the pressure is increased, and a particular heating current is fed through the parts. Under the influence of this pressure and heating current, the parts 1A, 1B can reach a yield point. The reaching of the yield point is detected by the yield point temperature determiner of the regulator R. As soon as the reaching of the yield point temperature has been measured or determined otherwise, the process is automatically taken to a third step C under the influence of the regulator R.

During this third process step, a still higher pressure is exerted on the parts 1A, 1B, while the heating current I is maintained at substantially the same value as in the second step B. Under the influence of the relatively low pressure with the second step B, the yield point temperature can be reached relatively quickly. Under the influence of the increased pressure with the third step C, the parts 1A, 1B can then flow together relatively quickly, for realizing a desired weld of a particular weld thickness. Here, during the welding process, the parts may, for instance, flow together over a distance of no more than approximately 10 mm, in particular over a distance of no more than approximately 5 mm, for instance a distance of approximately 4 mm or less. When a desired weld thickness has been reached, a cooling stage D can be carried out, in which the current is switched off, and the parts 1A, 1B are still kept against each other with a particular, lower pressure. It is noted that, preferably, a gradual change of the pressure p is used between the different process steps, in contrast with the abrupt transitions schematically shown in FIG. 5.

EXAMPLE 2

Figure 7:
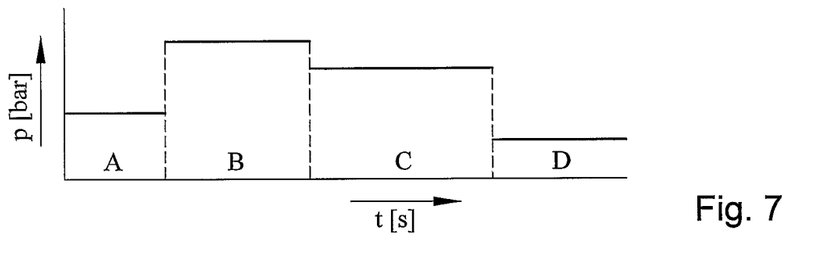
FIG. 7 shows a force-time diagram of a second regulation according to the invention.
Figure 8:
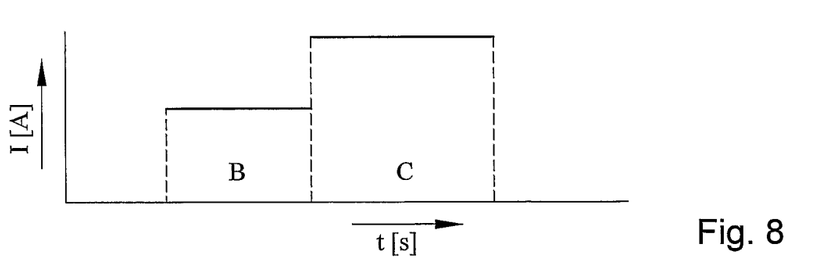
FIG. 8 shows a current-time diagram of the second regulation according to the invention.

FIGS. 7 and 8 show a second example of a method according to the invention, which differs from the example shown in FIGS. 5 and 6 in that, upon reaching the yield point temperature (start of process step C) the pressure is, conversely, decreased by the regulator R. In addition, with the third step C, the heating current is, conversely, increased when the yield point temperature has been reached. In this manner, the parts 1A, 1B can be pressed together with relatively little force, which prevents the creation of large welding grooves. Due to the automatic increase of the welding current, it is also achieved that the parts 1A, 1B are still sufficiently heated to continue to flow well, so that the parts can still flow together quickly over a desired distance and so that the welding process can still be carried out quickly. Also in this case, preferably a gradual change of the pressure p is used. The same holds for changes of the heating current I.

EXAMPLE 3

Figure 9:
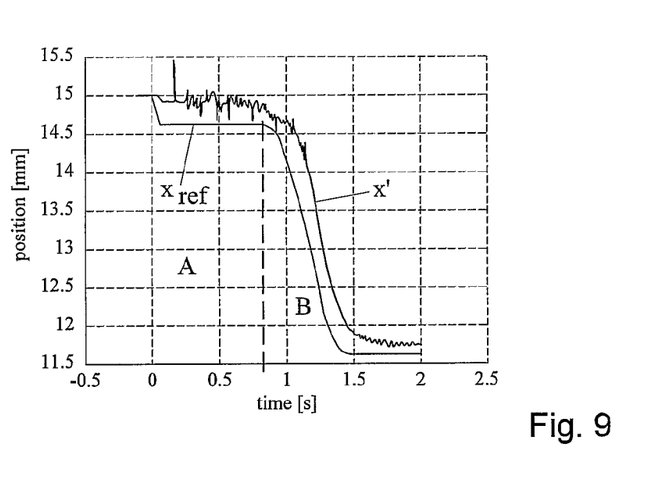
FIG. 9 shows a position-time diagram of a third regulation according to the invention.
Figure 10:
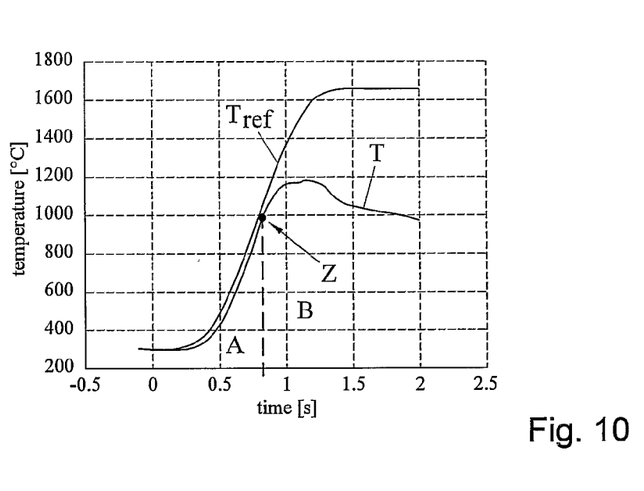
FIG. 10 shows a welding temperature-time diagram of the third regulation according to the invention.
Figure 11:
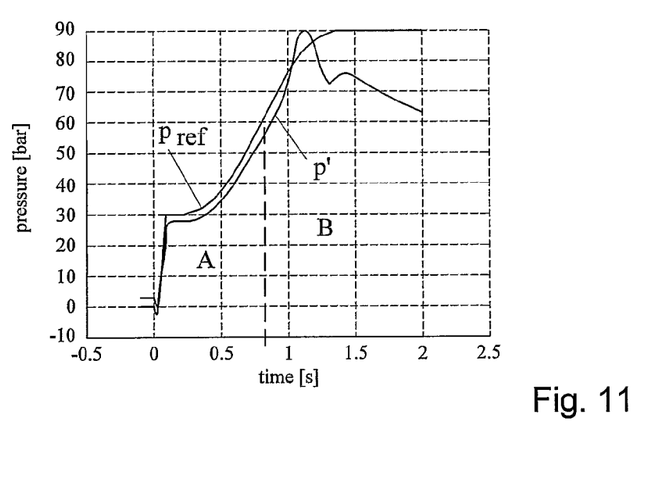
FIG. 11 shows a pressure-time diagram of the third regulation according to the invention.

FIGS. 9-11 show an example according to the invention, where the welding process proceeds in a range-controlled manner under the influence of the regulator R. The regulator R has a predetermined displacement range $x_{ref}$, a predetermined temperature range $T_{ref}$, and a predetermined welding pressure range $p_{ref}$. In addition, the regulator R is provided with an above-mentioned yield point temperature determiner, which can calculate what the instantaneous yield point temperature $T_y$ of the parts 1A, 1B to be welded is during the welding process. FIG. 4 shows, for instance, a possible regulation scheme which is usable in the present example.

As FIGS. 9-12 show, the welding process for instance starts at time t=0 s. Then, in a first process step A, the parts 1A, 1B are pressed against each other with a set welding pressure p, while a heating current I set by the regulator R is fed through the parts 1A, 1B. Under the influence of these input parameters welding pressure p and heating current I, output parameters pressure p', displacement x' and temperature T are reached. As follows from the above, these output parameters can be measured and/or calculated in different manners during the process.

The regulator R then compares one or more of the output parameters x', p', T reached with the predetermined respective ranges $x_{ref}$, $p_{ref}$, $T_{ref}$ and controls the input parameters p and I for counteracting deviations between those output parameter(s) and the predetermined range thereof. The first process step may, for instance, be controlled substantially by the regulator R and readjusted on the basis of the welding pressure (see FIG. 11), on the basis of the welding temperature T reached (see FIG. 10), or of both.

Figure 12:
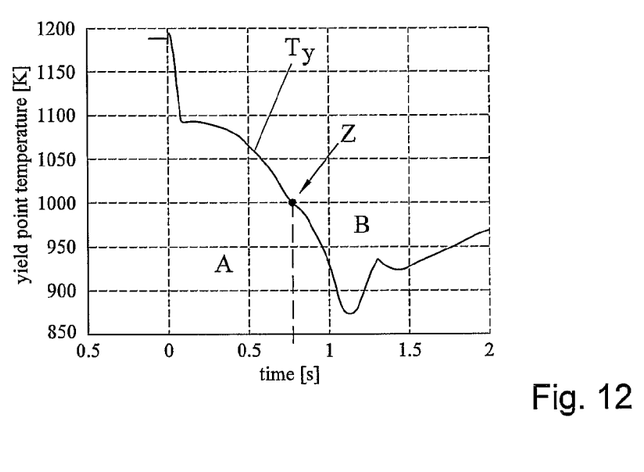
FIG. 12 shows a diagram of the yield point temperature as a function of time of the third regulation according to the invention.

Further, the regulator R may, for instance, compare the instantaneous yield point temperature $T_y$ with the temperature T of the parts 1A, 1B to be welded. In FIGS. 10 and 12, arrow Z indicates the moment, at which moment the welding temperature T is equal to the yield temperature $T_y$. Due to the latter comparison, the regulator R knows that the yield temperature $T_y$ has been reached at that moment. Then, the welding process may, for instance, be adjusted under the influence of the regulator R, and be taken to a second process step B, while the regulation is, for instance, carried out on the basis of a different process output parameter. During that second process step B, a range regulation may, for instance, be carried out on the basis of the displacement x' reached and the associated reference $x_{ref}$ (see FIG. 9), while the welding current p' reached and/or the welding temperature T reached play a secondary role in the process regulation during that second process stage.

In this manner, the quality of the end result of the welding process, i.e. the quality of the weld obtained thereby, is, for instance, relatively little sensitive to material differences of various parts to be welded during successive welding runs. Differences in dimensions between successive parts to be welded can thus also be obviated well by the regulator R. In addition, in this manner, the parts to be welded can be brought to the yield point temperature relatively gradually and in a particularly well controlled manner, to then flow together in a particularly well controlled manner.

In addition, the regulator R may, for instance, be arranged for involving specifications of the welding system into the regulation of a welding process. Thus, the regulator may, for instance, have a welding pressure maximally reachable by the system and/or a welding current maximally reachable by the system, for instance because such data are stored in the regulator R. In that case, during a welding process, the regulator R can switch from a first set of parameter ranges $x_{ref}$, $p_{ref}$, $T_{ref}$ to a different set of such ranges, if the regulator R determines that the system needs to operate outside its specifications to weld the parts 1A, 1B to be welded according to that first set of ranges $x_{ref}$, $p_{ref}$, $T_{ref}$. The second set of parameter ranges may, for instance, be suitable for welding parts together utilizing lower welding pressures, lower welding currents, in particular if it is found during the welding process that the first set of parameter ranges $x_{ref}$, $p_{ref}$, $T_{ref}$ requires too high a welding pressure and/or welding current.

Of course, there are many other possibilities in addition to the regulation variants described in these three examples for automatically readjusting the welding process on the basis of various process parameters.

It goes without saying that the invention is not limited to the exemplary embodiment described. Various modifications are possible within the framework of the invention as it is set forth in the following claims.

Thus, the welding process may, for instance, comprise a resistance upset welding process, or a different welding process, for instance a spot welding process. Further, the welding process may, for instance, be regulated on the basis of various physical properties of the parts to be welded, for instance on the basis of a particular temperature and/or electrical resistance of the parts to be welded, near the contact surfaces.

What is claimed is:

1. A method for welding weldable parts together, the method comprising steps of:
    subjecting the parts to a thermal welding process for making the parts flow together at contact surfaces, wherein the welding process depends on a plurality of input parameters, the input parameters comprising a pressure exerted on the parts to be welded and a heating current fed through the parts, wherein a plurality of welding process output parameters depend on the input parameters;
    generating a result of a yield point determination to determine whether a yield point has been reached during the welding process; and
    readjusting at least one of the input parameters during the welding process using at least one regulator when it has been determined that the yield point has been reached based on the generated result of the yield point determination.

2. A method according to claim 1, wherein the regulator is a multivariable regulator that readjusts a plurality of said process input parameters.

3. A method according to claim 1, further comprising a step of:
    determining what value a yield point-dependent process output parameter has when the parts to be welded reach a yield point; and
    determining the value of said yield point-dependent process output parameter during the welding process for determining when the said yield point is reached.

4. A method according to claim 1, further comprising a step of:
    bringing the pressure from a first value to a higher second value using the regulator when it has been determined that the said yield point has been reached.

5. A method according to claim 1, further comprising a step of:
    bringing the pressure from a first value to a lower second value using the regulator when it has been determined that the said yield point has been reached.

6. A method according to claim 1, further comprising a step of:
    feeding a first electric current through the weldable parts before said yield point has been reached;
    increasing the electric current using the regulator when it has been determined that the said yield point has been reached; and
    optionally then reducing the current after a particular welding period.

7. A method according to claim 1, wherein the regulator has at least two predetermined profiles or ranges of at least two different output parameters, and the process further comprises:
    regulating the welding process using the regulator on the basis of at least one of the profiles or ranges before it has been determined that the yield point has been reached; and
    regulating the welding process using the regulator on the basis of at least another of the profiles or ranges after it has been determined that the yield point has been reached.

8. A method according to claim 1, wherein, during the welding process, a welding temperature or electrical resistance is determined by a calculation, or by at least one measurement of a said process output parameter.

9. A method according to claim 1, wherein at least one said process output parameter comprises at least one of the following parameters:
    a temperature of the parts to be welded;
    an electrical contact resistance between said contact surfaces;
    an electric potential difference between said parts to be welded, or between electrodes provided on those parts;
    a relative position, displacement or speed of displacement of the parts to be welded.

10. A method according to claim 1, wherein the parts to be welded comprise end parts of a plate bent towards each other for manufacturing an annular object.

11. A method according to claim 1, wherein the readjusting comprises readjusting at least two of the input parameters during the welding process.

12. A welding system, wherein the welding system is arranged for subjecting parts to a thermal welding process, wherein the system is arranged for bringing the parts to a yield point at contact surfaces, wherein the system comprises:
    a determiner that determines at least one welding temperature or electrical resistance of said parts during the welding process;
    a yield point determiner that generates a result of a yield point determination that determines when the yield point has been reached; and
    at least one regulator that readjusts at least one welding process input parameter based on the result of the yield point determination.

13. A system according to claim 12, wherein the regulator is arranged for determining when the yield point of the weldable parts has been reached, wherein said regulator is arranged for automatically changing the value of at least one of said process input parameters during the welding process when the yield point of the weldable parts has been reached.

14. A system according to claim 13, wherein the regulator is arranged for comparing the results of the welding temperature determiner or electrical resistance determiner with each other, for determining when the said yield point has been reached.

15. A system according to claim 12, provided with a memory for storing a yield point value of a process output parameter determined by means of calculation or experiment, wherein the regulator is arranged for comparing the stored yield point value with a measured or calculated value of that process output parameter, for determining whether the yield point has been reached.

16. A system according to claim 12, wherein the regulator is arranged for using the result of the at least one welding temperature determination or resistance determination for readjusting a plurality of said process input parameters.

17. A system according to claim 12, wherein the regulator has at least two predetermined profiles or ranges of at least two different output process parameters, wherein the regulator regulates the welding process on the basis of at least one of the profiles or ranges before it has been determined that the yield point has been reached, and the regulator regulates the welding process on the basis of at least another of the profiles or ranges after it has been determined that the yield point temperature has been reached.

18. A regulator of a system according to claim 12, wherein the regulator comprises the yield point determiner.

19. A regulator of a system according to claim 12, wherein the regulator is a computer comprising a program provided with computer code, arranged for, after having been loaded into the computer, making the computer function as a regulator.

20. A method according to claim 1, wherein the welding process is a resistance upset welding process or a spot welding process.

* * * * *